H. G. OSBORNE.
EXPANSION BOLT.
APPLICATION FILED JULY 1, 1913.
1,139,712.  Patented May 18, 1915.
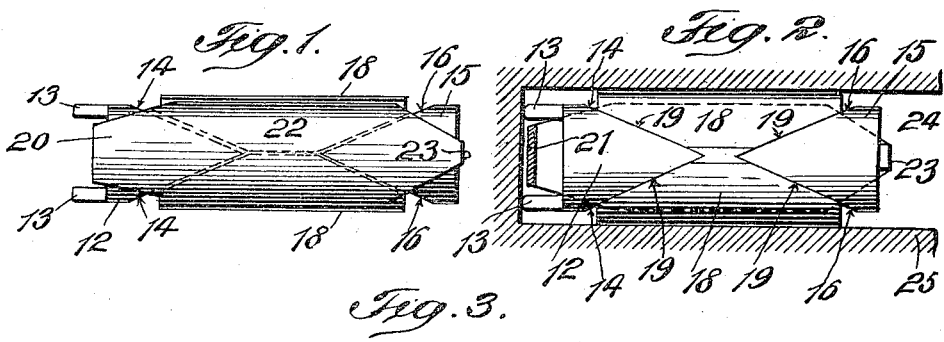
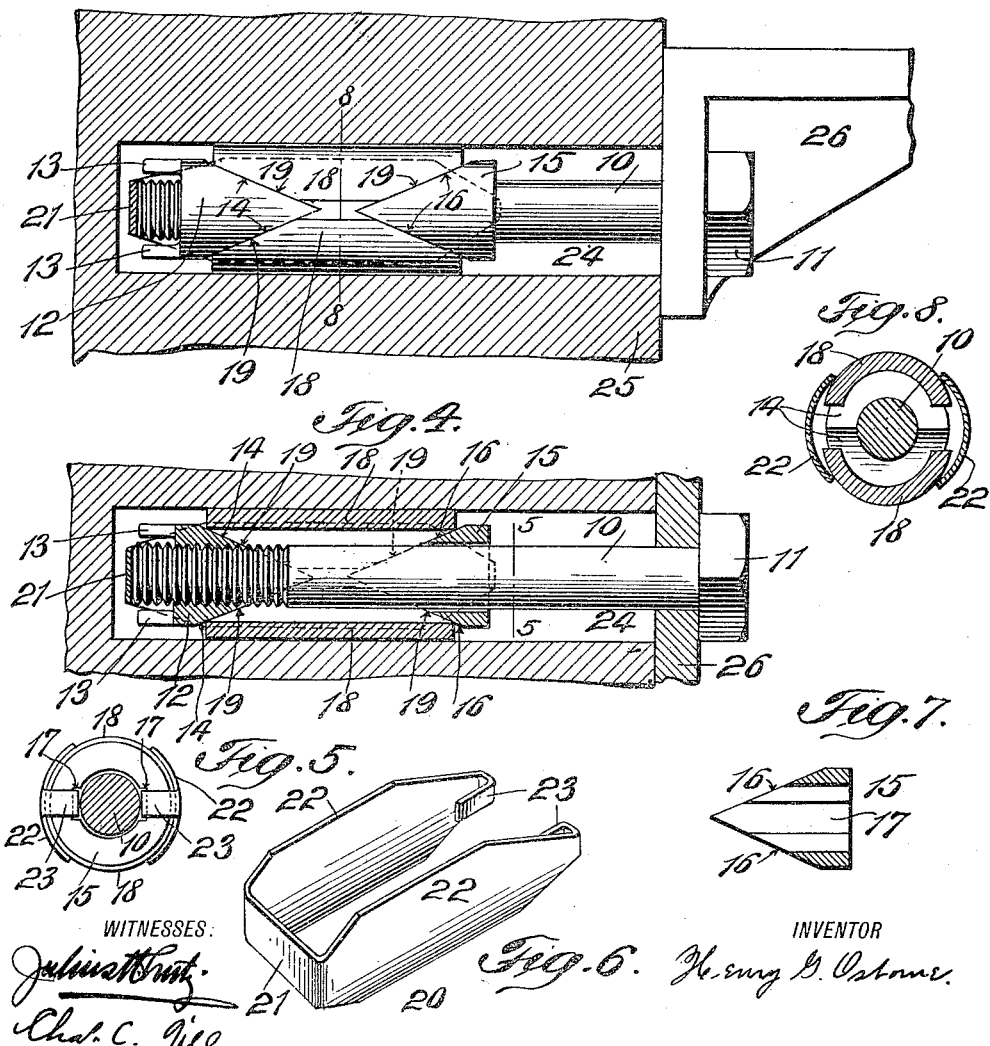
WITNESSES  INVENTOR
Henry G. Osborne

UNITED STATES PATENT OFFICE.

HENRY G. OSBORNE, OF BROOKLYN, NEW YORK.

EXPANSION-BOLT.

1,139,712.

Specification of Letters Patent.  Patented May 18, 1915.

Application filed July 1, 1913. Serial No. 776,746.

*To all whom it may concern:*

Be it known that I, HENRY G. OSBORNE, a citizen of the United States, and a resident of Brooklyn, in the county of Kings and State of New York, have invented certain new and useful Improvements in Expansion-Bolts, of which the following is a specification.

My invention relates to expansion anchors for machine bolts.

The objects are, to provide an anchor for machine bolts which will have parallel expansion in four directions, and which may be expanded in the hole prior to the insertion of the bolt. Further objects being, to provide an anchor which may be expanded by a bolt independent of contact with the work it is desired to fasten, also one which will permit the bolt to advance forward in the hole while the expansible members are in frictional contact with the sides of the hole, and one whose parts are self confined when the anchor is assembled.

The invention is fully disclosed in the accompanying drawing, in which like numbers represent like parts, and in which:

Figure 1 is a side elevation of my improved expansion anchor. Fig. 2 shows a section of a wall with a hole in which the anchor is partially expanded, the anchor being shown in side elevation, with a portion of the bridle frame broken away. Fig. 3 shows the anchor expanded in a hole in a wall by a bolt which also clamps a bracket. A portion of the bridle frame being shown by dotted lines. Fig. 4 shows the anchor in longitudinal section, expanded in a hole by a bolt, a piece of work being clamped under the head of the bolt; the bolt being shown in elevation. Fig. 5 is a view of the outer end of the anchor, with the bolt cut away through line 5—5 of Fig. 4. Fig. 6 is a perspective view of the bridle frame, the sides of which partially envelop the other members of the anchor when the anchor is assembled. Fig. 7 is a longitudinal sectional view of the wedge collar. Fig. 8 is a sectional view through line 8—8 of Fig. 3.

In the construction of my expansion bolt I use a machine bolt 10, of ordinary construction, having screw threads at the forward end and an enlarged head 11 at the rear end. A nut 12, preferably cylindrical in form, is provided for engagement with the threads of the bolt. The nut is formed with lugs 13—13 projecting beyond the body portion at the forward end, the rear end is cut away to form a wedge with sides 14—14. A collar 15 is made which slips freely over the bolt and the forward end is formed as a wedge having the sides 16—16. The collar is provided with internal longitudinal recesses 17—17 into which the hooked ends of the bridle frame fit. Shell members 18—18 are formed of half sections of tubes, with portions of the abutting faces cut away to form contact surfaces 19 for engagement with the wedges. A bridle frame 20 is provided having a narrow central transverse portion 21 which passes over the forward end of the nut between the lugs 13—13, and having parallel sides 22—22, curvilinear in form, which partially envelop the shells 18—18 and prevent the shells from separating until they are forced apart by the wedges. The sides of the bridle frame are narrowed down and bent to form hooks 23—23 at their free ends. The hooked ends 23—23 fit into the recesses 17—17 of the collar holding it in place when the anchor is assembled and also causing the collar to be drawn toward the nut as the end of the bolt forces the bridle frame forward.

In the drawing the bridle frame is shown relatively thin, as being stamped from sheet metal, although it may be made otherwise, or strengthened by reinforcement.

When it is desired to fasten any object to a wall of stone, brick or the like, with my expansion bolt, the expansion anchor is inserted in a hole 24, drilled in a wall 25, and is pushed forward until the lugs 13—13 strike the bottom of the hole, the nut is then prevented from further forward movement. If the pressure is continued against the rear of the anchor the collar will move forward;

the tapered sides 16—16 of the collar will act against the contact surfaces 19—19 on the adjacent sides of the shells 18—18 to separate and move the shells forward at the same time. In moving forward the shells are caused to separate also by the tapered faces 14—14 of the nut. As the wedge faces on the nut and collar are of the same angle the action of both will be equal, and the separation of the shells will be uniform. The shells in separating act to expand the sides 22—22 of the bridle frame, as clearly illustrated in Fig. 8 of the drawing, resulting in parallel expansion of the anchor in four radial directions.

The anchor may be expanded in the hole sufficiently to prevent it from turning as the bolt is being screwed into the nut. With the anchor in place in the hole the bolt 10 is passed through a hole in the object 26 to be fastened and is inserted in the expansion anchor. As the threads of the bolt are screwed into the nut the bolt advances until the bolt head draws the work against the face of the wall, further turning of the bolt tends to draw the anchor outwardly, this is checked as soon as the end of the bolt passes through the nut and strikes the transverse portion 21 of the bridle frame, from that time on turning the bolt draws the nut 12 and the collar 15 toward each other, and the wedges on each exert great pressure to expand the anchor against the sides of the hole. When the nut and collar are being drawn toward each other, as previously explained, the bolt moves inwardly at the same rate that the collar and bridle frame do, until the bolt head is exerting the maximum pressure on the object held against the wall; beyond this point tightening up on the bolt will draw the nut toward the bolt head and the shells 18—18 will be wedged backward against the collar and outward against the sides of the hole, expanding the sides of the bridle frame at the same time. The forward travel of the bolt is not checked as soon as the shells grip the sides of the hole, there being a margin of travel beyond that which permits the bolt head to firmly clamp the work against the face of the wall.

The lugs 13—13 are a valuable feature of my device as they provide the space between the front of the nut and the bottom of the hole which furnishes clearance for the end of the bolt to pass beyond the threaded portion of the nut, without striking the bottom of the hole, when the anchor is pushed into the hole to the bottom.

Having described my invention, what I claim as new, and desire to secure by Letters Patent, is:

1. The combination in an expansion bolt of, a tapered nut, a tapered collar, expansible members engaged by said nut and collar, a longitudinally extending bridle frame adapted to hold the anchor parts in assembled relation, and a bolt coacting with the nut and bridle frame to expand the anchor on parallel lines, said bridle frame being engaged with said collar and adapted on the screwing inwardly of the bolt to force said collar between the rear ends of said expansible members.

2. The combination in an expansion bolt of, a tapered nut, a tapered collar, a bolt, separable shell members adapted to be expanded by the said nut and collar, and a bridle frame having a transverse portion for engagement with the end of the bolt and side portions adapted to be expanded by the shell members as said shell members are separated by the nut and collar.

3. The combination in an expansion bolt of, a threaded bolt, a wedge shaped collar loosely mounted on the bolt, a wedge shaped nut for engagement with the threaded portion of said bolt, lugs projecting forward of the body portion of said nut for abutment against the bottom of the hole, shell members adapted to be separated by said collar and nut, and a bridle frame having a narrow central transverse portion for engagement with the forward end of the bolt, parallel curvilinear sides partially enveloping and adapted to be separated by the shell members, the free ends of said bridle frame forming hooks for engagement with the wedge collar.

4. The combination in an expansion bolt of, a nut, a collar, shell members coacting with said nut and collar, a bridle frame having a central transverse portion for engagement with the end of a bolt, side members terminating in hooks for engagement with the collar, and means to expand the shells as the bolt advances.

5. The combination in an expansion bolt of, a plurality of expansible members adapted to be expanded by wedges, a bridle frame coacting with the end of a bolt and a nut, and means permitting the bolt to advance with respect to the expansible members as the anchor is expanded.

6. The combination in an expansion bolt of, a bolt, a tapered nut, a tapered collar, shell members having portions of their abutting faces tapered, a frame member partially enveloping the other members, said frame member having curvilinear sides adapted to be expanded by the shell members.

7. The combination in an expansion bolt of, a threaded bolt, a wedge nut for engagement with the forward end of said bolt, a wedge collar fitting loosely over the bolt, expansible members coacting with said nut and collar, and a bridle frame engaging the collar, said bridle frame coacting with the bolt to draw the nut and collar together to expand the said expansible members, and said nut having a projection forward of said expansible members to abut against the bottom of the hole to prevent further forward movement of the nut and to cause said nut to separate the forward ends of the expansible members as they are advanced.

Signed at New York city, in the county of New York and State of New York, this 30th day of June A. D. 1913.

HENRY G. OSBORNE.

Witnesses:
ARTHUR MARION,
CHAS. C. GILL.

Copies of this patent may be obtained for five cents each, by addressing the "Commissioner of Patents, Washington, D. C."